US012202287B2

(12) United States Patent
Caselli et al.

(10) Patent No.: US 12,202,287 B2
(45) Date of Patent: Jan. 21, 2025

(54) METHOD FOR MANUFACTURING A BULLNOSE TILE AND A BULLNOSE TILE

(71) Applicant: Dal-Tile, LLC, Dallas, TX (US)

(72) Inventors: Claudio Caselli, Dallas, TX (US); Rahul Patki, Richardson, TX (US)

(73) Assignee: Dal-Tile, LLC, Dallas, TX (US)

( * ) Notice: Subject to any disclaimer, the term of this patent is extended or adjusted under 35 U.S.C. 154(b) by 316 days.

(21) Appl. No.: 16/830,348

(22) Filed: Mar. 26, 2020

(65) Prior Publication Data

US 2021/0300099 A1 Sep. 30, 2021

(51) Int. Cl.
*B41M 5/00* (2006.01)
*B41M 7/00* (2006.01)
*E04F 15/08* (2006.01)

(52) U.S. Cl.
CPC .......... *B41M 5/007* (2013.01); *B41M 5/0047* (2013.01); *B41M 7/0045* (2013.01); *E04F 15/08* (2013.01)

(58) Field of Classification Search
CPC .. B41M 5/007; B41M 5/0047; B41M 7/0045; E04F 15/08
See application file for complete search history.

(56) References Cited

U.S. PATENT DOCUMENTS 3,189,177 A 6/1965 Mays et al.
6,787,084 B1 9/2004 Orlandi
7,383,768 B2 6/2008 Reichwein et al.
7,550,192 B2 6/2009 Dempsey et al.
7,703,575 B2 4/2010 Berger, II et al.
2002/0046576 A1 4/2002 Campbell
2004/0219339 A1 11/2004 Dempsey et al.
2007/0085983 A1 4/2007 Ko et al.
2007/0115336 A1 5/2007 Ko et al.
2007/0283648 A1 12/2007 Chen
2008/0261000 A1 10/2008 White et al.
2008/0280061 A1 11/2008 Questel et al.
2011/0249056 A1 10/2011 Weingartner
2013/0100207 A1* 4/2013 Van Der Zwan ...... B41J 25/308
(Continued)

FOREIGN PATENT DOCUMENTS

CN 101973171 A 2/2011
EP 1063068 A2 12/2000
(Continued)

OTHER PUBLICATIONS

International Search Report and Written Opinion for International (PCT) Application No. PCT/US21/23810 mailed Jun. 4, 2021.
(Continued)

*Primary Examiner* — Robert S Walters, Jr.
(74) *Attorney, Agent, or Firm* — Troutman Pepper Hamilton Sanders LLP; James E. Schutz; Chris N. Davis

(57) ABSTRACT

A method for manufacturing a bullnose tile comprising the steps of providing a ceramic tile that comprises a base body made of a ceramic material, wherein the base body has a main surface and a bullnose edge; providing a decorative layer on top of the bullnose edge by printing a curable ink to form a décor; and curing the curable ink; wherein the curable ink, after printing, is in direct contact with the ceramic material of the base body.

12 Claims, 2 Drawing Sheets

(56) References Cited

U.S. PATENT DOCUMENTS

| | | | |
|---|---|---|---|
| 2015/0258845 A1 | 9/2015 | Hannig | |
| 2015/0345141 A1 | 12/2015 | Caselli et al. | |
| 2017/0313114 A1 | 11/2017 | McKnight | |
| 2018/0291624 A1 | 10/2018 | Caselli et al. | |
| 2020/0156106 A1* | 5/2020 | Zemel | B05B 13/0431 |

FOREIGN PATENT DOCUMENTS

| | | | |
|---|---|---|---|
| EP | 1324888 | B1 | 5/2004 |
| FR | 2868735 | A1 | 10/2005 |
| IT | MO2012A000118 | A | 5/2012 |
| JP | 2002103774 | A | 4/2002 |
| SI | 23200 | A2 | 4/2011 |
| WO | 2005095006 | A1 | 10/2005 |
| WO | 2007054812 | A3 | 5/2007 |
| WO | 2009118507 | A1 | 10/2009 |
| WO | 2011095865 | A | 8/2011 |
| WO | 2014/109701 | A1 | 7/2014 |
| WO | 2017/163269 | A1 | 9/2017 |

OTHER PUBLICATIONS

TileMasterGa "How To Make Bullnose (with my comments)—Round Edge Blade Stone Marble tile installation atlanta" Online video clip. https://www.youtube.com/watch?v=QTgHq8C_zl Jun. 11, 2009, accessed on Nov. 29, 2016, 1 page.
English Abstract of FR2868735A1, 5 pages.
English Abstract of ITMO20120118A1; 1 page.
Machine Translation of JP2002103774, 8 pages.
European Search Report and Opinion for corresponding European Application No. 21775723.6 dated Feb. 16, 2024.

* cited by examiner

METHOD FOR MANUFACTURING A BULLNOSE TILE AND A BULLNOSE TILE

BACKGROUND

1. Field

The present invention relates to a method for manufacturing a tile made of a ceramic material and a tile made of a ceramic material. In particular the invention relates to a method for manufacturing a bullnose tile, for example a skirting, and a bullnose tile.

2. Background

A ceramic tile, e.g., for floor and walls, comprises a base body made of a ceramic material. The ceramic tile further comprises at least one glaze layer covering a main surface of the ceramic, the glaze is solidified and fixed to the base body through a firing treatment at high temperature, for example around 1200° C. in case the base body is made of porcelain, that is the same treatment for consolidating the base body too. The process for manufacturing a bullnose tile usually starts from a fired tile and comprises the step of cutting one tile into one or more pieces. Said pieces are then grinded on at least one edge so that said edge is given a bullnose shape. This cutting and grinding operation removes part of the glaze thereby revealing the base body material, moreover the bullnose edge is a portion of the piece that is use is intended to be visible and, consequently, needs to be provided with a décor.

In the art are known two standard ways to produce a bullnose tile. The first way comprises the step of glazing and decorating with ceramic inks or color the bullnose edge. This operation requires a second firing treatment to solidify and fixing the glaze on the bullnose, it is therefore complex and expensive. The second way provides for spray painting the bullnose edge with one or more layers of paint. However, this paint cannot be printed but can only make solid color décor, or dotted décor. Moreover, every layer of paint needs to be dried in a drying chamber for a prolonged time, so that the process is also time consuming, inefficient and generates a lot of VOCs. It is also to be noted that both the standard methods require the application of a base coat before the application of a colored or décor coat. In the first case the basecoat is in form of a glaze that is sprayed onto the bullnose and in the second case it is in the form of a sprayed basecoat paint.

US 2015/0345141 A1, by the same inventor of the present application, provides and alternative method that comprises the steps of providing a radiation curable base coat, digitally printing decorative coat with a radiation curable ink, and providing a radiation curable clear coat on top of the ink. Each of said applications is followed by a step of radiation curing the relative coat. The radiation curing mechanism allows to obtain fast and efficient process that also provides to the final product a pleasant appearance. However, the inventors have found that the clear coat, that provides to the bullnose edge a high resistance to chemical attack, scratching/physical damage and light/UV damage, may negatively affect the adhesion promotion effect provided by the basecoat. Therefore, in order to obtain the best performances, it is important to identify the ideal combination of basecoat and clearcoat.

ITRE2010A000006 discloses a method wherein that comprises the steps of providing a radiation curable base coat, digitally printing decorative coat with a radiation curable ink. Moreover, to obtain high resistance to chemical attack, scratching/physical damage and light/UV damage, it suggests mixing ceramic particle with the radiation curable ink and then again firing the bullnose tile as in the first method. In this case the curable ink can be degraded during the firing step. So, the curable ink serves only to help keep the tonality of the ceramic décor of the bullnose constant.

The present invention aims in the first place to provide an alternative method for manufacturing a ceramic tile, in particular a bullnose tile which, in accordance with several of its preferred embodiments, is directed to solve one or more of the problems arising in the state of the art.

BRIEF SUMMARY OF THE INVENTION

In one aspect, the invention provides a method for manufacturing a bullnose tile comprising the steps of: providing a ceramic tile, the ceramic tile comprising a base body made of a ceramic material, wherein the base body has a main surface and a bullnose edge; providing a decorative layer on top of the bullnose edge, the step comprising printing a radiation curable ink to form a décor; and curing the radiation curable ink, wherein the radiation curable ink, after printing, is in direct contact with the ceramic material of the base body.

In another aspect, the present invention provides a bullnose tile comprising a ceramic body and a bullnose edge, wherein the bullnose edge comprises a cured digitally printed décor in direct contact with the ceramic body.

These and other objects, features and advantages of the present invention will become more apparent upon reading the following specification in conjunction with the accompanying description, claims and drawings.

BRIEF DESCRIPTION OF THE FIGURES

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION OF THE INVENTION

Figure 1:
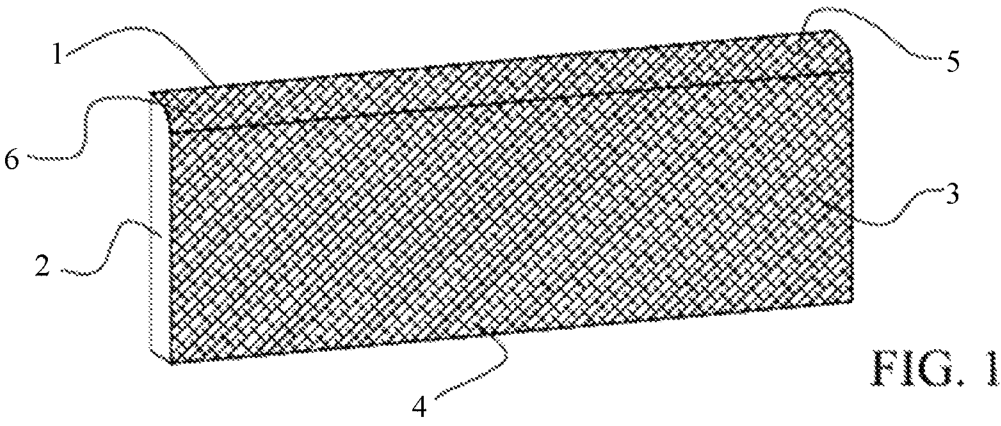
FIG. 1 shows a perspective view of the bullnose tile according to the invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/of" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

The present invention, according to a first independent aspect, the invention relates to a method for manufacturing a bullnose tile comprising the steps of: providing a ceramic tile that comprises a base body made of a ceramic material, wherein the base body has a main surface and a bullnose edge; providing a décor on top of said bullnose edge, by inkjet printing a curable ink; and curing said curable ink. The curable ink after printing is in direct contact with the ceramic material of the base body. The expression "said curable ink after printing is in direct contact with the ceramic material", as well as an alternative wording "said curable ink is printed in direct contact with the ceramic material", as used herein, means that there is not any layer between the décor and the ceramic material. In particular it means that the bullnose tile is free from any basecoat. For example, the method is free from any substance application step between the step of providing the tile and the step of providing the décor. Therefore, this expression does not require that the décor is printed with a direct contact printing technique, like for example offset printing, but it can be performed via contactless printing techniques. The inventors have found that the curable inks, after curing, show a very good adhesion with the ceramic material so that there is no need to add any intermediate layer between the substrate and the ink.

The term "ceramic material" as used herein refers to a material obtained by sintering at high temperature of mineral raw material, like for example clays, feldspar, calcium carbonate, metals oxides, silica etc. The ceramic material according to the invention can be for example porcelain, earthenware, clay ceramic, red body tile, monoporosa, single fired ceramic, clinker etc. According to EN 14411, ceramic materials are classified on the basis of water absorption measured according to EN ISO 10545 and on the forming method. In a first preferred embodiment of the invention, the ceramic material of the base body belongs to the class B1a, i.e. it shows a water absorption below 0.5%, for example porcelain. According to a second preferred embodiment of the invention the ceramic material of the base body belongs to the class Bib or B2, i.e., shows a water absorption between 0.5% and 3%. It is possible that in other embodiments the ceramic material can belong to other classes.

Preferably, the ceramic tile comprises at least one glaze layer covering the main surface of the base bade. The term "glaze layer" refers to a vitreous coating. Moreover, said main surface of the ceramic tile can comprise a décor, for example imitating a natural material, like wood, stone or marble or any desired design. Said décor of the main surface is made by means of ceramic colors, preferably ceramic inks, for example comprising metal oxides. The décor of the main surface is preferably digitally printed by means of an inkjet printer. The main surface of the ceramic tile may comprise at least a background glaze provided below said décor. Preferably, the ceramic tile comprises also a transparent glaze on top of the décor.

Within the context of the present application, with bullnose edge is meant a rounded edge, preferably convex, a beveled edge, a straight edge and in general an edge of the tile that, in use, is destined to be visible. Preferably said bullnose edge is rounded. The ceramic material of the base body is visible and exposed at the bullnose edge. For example, said bullnose edge is free from any glaze layer or décor, when it is provided in the first step of the method according to the invention.

As used herein, the expression "bullnose tile" refers to a ceramic tile comprising at least a bullnose edge. The expression "ceramic tile" may refer to any kind of ceramic tile, not necessarily provided with the bullnose. The bullnose tile can be for example a skirting, a wall tile or a stair step.

The method may comprise the step of cutting a ceramic tile into one or more pieces, that can preferably precede the step of providing the bullnose tile. In fact, in case of production of a skirting, for example, the skirting is a rectangular and oblong piece cut from a larger rectangular or squared tile. Said step of cutting can be performed either via wet cutting or via dry cutting. In case of wet cutting, the method further comprises the step of drying the cut pieces to remove the lubricant water or fluid. The method may also comprise the step of providing said ceramic tile or said one or more cut pieces with said bullnose edge, for example by wet or dry grinding, to obtain the bullnose tile. In case of wet grinding, the method further comprises the step of drying the cut pieces to remove the lubricant water or fluid. The drying steps for removing the lubricant water can be preferably performed by hot air. The step of cutting and/or the step of providing the bullnose edge can be performed in line with all the other steps of the method, but it is possible that they are performed in a separate line or plant.

The step of providing the bullnose tile can comprise the step of placing the bullnose tile on a transporter or a conveyor, for example a belt, configured to transport the tile through multiple stations of the bullnose manufacturing equipment.

Advantageously, before said step of printing, the method may comprise the step of drying at least the bullnose edge, for example via an infrared lamp. Said step of drying at least the bullnose edge is a further drying step of those needed in case of wet cutting or grinding. Moreover, the method can comprise this further drying step irrespectively of the fact that the bullnose tile is cut or grinded. Due to this further drying step it is ensured that the bullnose edge is completely dry at the time of performing the step of printing. In fact, the porosity of the ceramic material forming the base material can absorb moisture present in the atmosphere thereby negatively affecting the adhesion between the ink and the ceramic material.

The décor provided on the bullnose edge in the relative step, can represent a natural product, a wood, a marble or any other design. Preferably the décor on the bullnose edge is the same, or it is based on, the décor on the main surface of the bullnose tile. Even more preferably the design of the décor on the bullnose edge can match the décor on the main surface, for example, in case of a wood design, a wood nerve can continue from the main surface to the bullnose edge without interruption.

The method of providing the décor is preferably performed by printing with a set of curable inks. Said curable inks are preferably radiation curable, for example UV radiation or electron beam (EB) curable. The set of curable inks may preferably comprise acrylic based inks, for example comprising blend of different types of acrylate oligomers and/or monomers such as polyester acrylate, polyether acrylate, urethane acrylate, epoxy acrylate. Preferably the inks comprise a photo initiator for activate curing of the ink in presence of a predetermined radiation.

In a first preferred embodiment of the invention the set of inks is a CMYK set, i.e., it comprises inks of Cyan, Magenta, Yellow and Black colors. Thus, according to the invention the CMYK set of inks is printed directly onto the ceramic material of the base body without the need of any primer and or basecoat. This first preferred embodiment is particularly effective in case the ceramic material of the base body has a light color, for example white, grey, beige and the shades thereof, this is especially the case when the ceramic material of the base body is porcelain. This first preferred embodiment is particularly effective also when the décor to be printed is composed of dark colors, for example dark woods, black marble or dark stone. Generally, this embodiment is preferred in cases where the color of the ceramic material of the body is lighter than the colors composing the décor. In this case, the color of the ceramic material represents a good background for the décor so that the color of the décor itself can sufficiently be developed.

In a second preferred embodiment of the invention the set of inks can comprise CMYK and one or more extra inks. Said extra inks can preferably comprise white and/or yellow ink. More preferably, said extra ink is printed directly onto the ceramic material of the base body without the need of any primer and or basecoat, and can be printed in order to create a background color for the décor formed mainly by the CMYK inks. The extra inks can also form part of the décor together with the CMYK inks. Moreover, in case of a yellow extra ink, the printer can be preferably configured to print two yellow inks, one part of the CMYK set and one forming the extra ink. The first preferred embodiment is particularly effective in case the ceramic material of the base body has a dark color, for example brown, red or dark grey, and shades thereof, and particularly when the ceramic material of the base body is red body clay. The second preferred embodiment is particularly effective also when the décor to be printed is composed of light colors, for example light woods, white marble or white/beige stone. Generally, the second embodiment is preferred in cases where the color of the ceramic material of the body is darker than the colors composing the décor. In this case, the extra inks can form a background covering the color of the ceramic material in order to help the development of the colors of the décor.

Thus, according to a first way to perform this second preferred embodiment of printing the décor, the method may comprise the step of printing the one or more extra inks immediately before the step of printing the CMYK inks. In this case the extra inks are printed in such a way to cover at least a portion, and preferably all of, the surface of the bullnose edge, thereby forming a background for the décor. Advantageously, said extra inks can be mixed together, after printing, in order to obtain the desired tonality or shades of the background. It is important to note that the extra ink is not a basecoat, a tie coat or a primer. Instead, the extra ink is an ink having the same chemical and physical characteristics of the CMYK inks, so that it provides the sole functions of covering the color of the ceramic material of the base body and help the development of the colors of the décor. Thus, the extra ink does not provide any adhesion improving effect. In this first way the extra inks can be printed with a separate printer that that for printing the extra CMYK inks, although the extra inks and the CMYK inks can also be printed with the same printer. Moreover, advantageously the extra inks are cured together with the CMYK inks. It is possible that in different embodiments, said extra ink(s) are cured before the step of curing the CMYK inks.

According to a second way to perform this second preferred embodiment of printing the décor, the method may comprise the step of printing the one or more extra inks together with the CMYK inks. In this way the extra inks, even if they are not printed to form a background, are mixed with the CMYK to help the development of the colors of the décor.

According to an embodiment, the set of inks can be formed of inks of nay color. Said color can be selected in such a way to be the best for performing the print of predetermined design colors. This embodiment is efficient when a reduced quantity of decors is printed. In fact, the CMYK provides the advantage to spread the gamut of color obtainable and therefore of the possible decors to be printed.

Preferably, said printing step is a single pass printing operation. Single pass means that the printer comprises stationary printing unit and that the piece to be printed, in this case the bullnose tile, moves of a continuous movement below, or in front of, the printing unit.

In particular, the printer may preferably comprise a plurality of printing unit aligned along said advancing direction, wherein each printing unit is configured to print one color. A printing unit, also often called a bar or beam, can comprise one or more printing head. Each printing unit preferably is dedicated to a specific color. Thus, the colors can be sequentially printed on the basis of the sequence of the printing unit in the advancing direction. In order to perform a second embodiment of the invention, the printing unit for printing the extra ink are preferably disposed upstream with respect to the advancing direction. In practice, wherein the first printing unit the tile meets along said advancing direction is configured to print an extra ink, more preferably a white ink. It is also to be noted that in case the extra ink comprises a yellow ink, the printer can preferably comprise one printing unit for printing the yellow extra ink and a second printing unit for printing the yellow ink of the CMYK set of inks.

Said step of printing said curable ink may comprise jetting droplets of 12 pl or more. For example, said step of printing said curable ink can be performed via a printhead having nozzle of 60 μm diameter. This can permit to print a décor layer having a thickness of between 6 to 25 μm. Moreover, the ink forming the décor is provided in a quantity of between 0.75 to 1.15 mg/sqcm. This helps in forming a layer that is sufficiently thick to show good adhesion performances and mechanical, physical and chemical properties. Moreover, the décor may be printed with a resolution of 360 dpi.

Preferably said printing units can be disposed at an angle or can be tilting relative to a supporting frame of the printer, in such a way to correctly perform the print on the configuration of the bullnose edge, especially when the latter is curved or inclined.

The printer can also comprise a detecting means adapted to identify the incoming bullnose tile and/or the décor on the main surface thereof, in such a way to determine the correct décor to print on the bullnose edge, so that the two decors can match.

The step of curing the curable ink may comprise exposing the curable inks to a radiation, for example UV radiation or electron beam (EB) radiation. In a preferred embodiment, wherein the curable inks are UV curable, the method comprises the step of exposing the bullnose tile, in particular the bullnose edge thereof, to a UV lamp, for example a mercury lamp, a gallium lamp or a LED-UV lamp. For curing the curable ink, a LED-UV lamp is preferred because emit radiation in a narrow wavelength radiation and with high intensity to cure even faster the inks. For example, the UV radiation can be in the UVA range of wavelength 315 to 400 nm. That is because for pigmented curable substance, like the inks, a longer wavelength is preferred to cure deeper the decorative layer. The step of curing the curable ink is preferably performed immediately after the step of printing. The step of curing the inks can also be a partial curing and the method may comprise a subsequent step of completely curing the inks. The radiation curing mechanism can be particularly advantageous compared to other curing mechanism because it provides for a fast and almost instantaneous curing.

The method may further comprise the step of providing a protective coat on top of said décor. Advantageously, the protective coat can be transparent or translucent. The protective coat can be either glossy or matte. Preferably the protective coat has a thickness that is higher than the thickness of the décor, i.e. of the decorative coat. The protective coat has the function to provide mechanical, physical and chemical resistance to the decorated bullnose, and particularly resistance to scratches/physical damage and chemical attack. But the inventors have surprisingly found that the protective coat on top of the décor helps in improving the adhesion of the décor to the ceramic material better than a basecoat or a primer that is provided between the ceramic material and the décor. This improved adhesion is unexpected.

Moreover, in a preferred embodiment the protective coat is a curable protective coat, preferably a radiation curable protective coat, for example UV radiation or electron beam (EB). The protective coat may preferably comprise an acrylic based resin, for example comprising blend of different types of acrylate oligomers and/or monomers such as polyester acrylate, polyether acrylate, urethane acrylate, epoxy acrylate. Preferably the protective coat comprises a photo initiator for activate curing of the protective coat thereof in presence of a predetermined radiation.

In some embodiments the protective coat can comprise fillers like mineral particles, for example talc, calcium carbonate, aluminum oxide, and combinations thereof. Said fillers can modify the aspect and/or the mechanical, physical and/or chemical performances of the protective coat. For example, said fillers can be a so-called flattening agent, adapted to reduce the glossiness of the protective coat.

The step of providing the protective coat is a coating step, for example a spray or roller coating step. In another embodiment, the step of providing the protective coat can be an inkjet printing step. A coating step may be preferable to inkjet printing because coating can permit application of a more viscous composition, such as a protective coat comprising fillers. Moreover, a coating technique can allow the formation of a thicker layer of protective coat. As an alternative to inkjet printing it is possible that other digital printing techniques can be used, for example valve jet printing. Valve jet printing allows printing more viscous inks and also provides a higher amount of inks to make a thicker protective coat, when compared to inkjet printing.

The step of curing the protective coat may comprise exposing the protective coat to a radiation, for example UV radiation or electron beam (EB). In a preferred embodiment wherein the protective coat is UV curable, the method comprises the step of exposing the bullnose tile, in particular the bullnose edge thereof, to a UV lamp, for example a mercury lamp, a gallium lamp or a LED-UV lamp. For curing the protective coat, a mercury lamp is preferred, in particular a mercury lamp that can emit UVB radiations. For example, the UV radiation can be in the UVB range of wavelength 280 to 315 nm. That is because for transparent curable substance, like the protective coat, a shorter wavelength is preferred to cure deeper the decorative layer. The step of curing the protective coat is preferably performed immediately after the step of providing the protective coat. If the step of curing the inks is a partial curing, the step of curing the protective coating can also comprise the step of complete curing the ink.

The method may further comprise finishing steps like sorting and/or packaging. Advantageously, all the operations of the method can be performed in line. In particular, the bullnose tile can be transported toward the several operative stations for performing the above-mentioned steps by an automated transporter or conveyor that can, preferably, be the same for all the operations. In fact, an important advantage of using radiation curable substances is that the manufacturing line or equipment is definitely smaller than those needed for the standard method. This advantage is further enhanced by the removal of the steps of providing a basecoat and curing the base coat.

According to a second independent aspect, the invention relates to a bullnose tile comprising a ceramic body and a bullnose edge, wherein said bullnose edge comprises a cured digitally printed décor in direct contact with the ceramic body. The bullnose tile according to the second aspect of the invention can comprise one or more of the features described with reference to the first aspect.

Printing a décor directly onto the ceramic material of the base body can provide very good adhesion, irrespective of the fact that the tile is a bullnose tile and the décor is printed onto the bullnose edge. The same effect can be obtained even by printing on the main surface of the ceramic tile.

According to a third independent aspect the invention relates to a method for manufacturing a ceramic tile comprising the steps of: providing a tile having a base body made of a ceramic material, wherein the base body comprises a main surface; providing a décor on top of said main surface, by inkjet printing a curable ink; curing said décor. The curable ink can be directly in contact with the ceramic material of said base body. The method according to this third independent aspect can comprise one or more of the features described above with reference to the first independent aspect. The invention therefore also relates to a tile having a base body made of a ceramic material, wherein the base body comprises a main surface. On the main surface, the tile can comprise a cured digitally printed décor in direct contact with the ceramic body.

According to an alternative fourth independent aspect of the invention, the method may comprise the steps of providing a sealant to at least partially fill the open porosity of the ceramic material before printing the décor. This is particularly the case when the ceramic material comprises a relatively high open porosity, in particular with ceramic material of class Bib and B2 according to EN 14411, but also for ceramic materials showing a porosity above 0.1%, for example above 0.3% according to EN ISO 10545. In fact, in this case the radiation for curing the ink can hardly reach all the curable ink when the latter permeates deeply the porosity. Therefore, a sealant that at least partially fills this porosity can help in keeping the curable ink on the surface to allow the curing thereof. Thus according to its fourth independent aspect the invention relates to a method or manufacturing a bullnose tile comprising the steps of: providing a ceramic tile that comprises a base body made of a ceramic material, wherein the base body has a main surface and a bullnose edge, and wherein said ceramic material has a water absorption above 0.1, more preferably above 0.3 measured according to EN ISO 10545, or belongs to the class Bib or B2 according to EN 14411; providing a sealant to at least partially fill the open porosity of the ceramic material at least in correspondence of said bullnose edge; providing a décor on top of said bullnose edge, by inkjet printing a radiation curable ink; curing said radiation curable ink.

According to a preferred embodiment of this fourth independent aspect, the sealant can comprise a curable substance, preferably a heat curable substance. Thus, the method further comprises the step of curing, preferably heat curing, for example drying the sealant. This sealant curing step is preferably performed before said step of printing.

Preferably the sealant can comprise polymer, oligomer, monomer or blends thereof that are epoxy based, siloxane based unsaturated polyester based or polyvinyl base or a mixture thereof.

The method according to the fourth aspect can comprise one or more of the features described in relation to the first aspect. Moreover, the idea of providing the sealant can be applied to the main surface of the base body in a manner similar to the third independent aspect thereby forming a further independent aspect. Furthermore, the invention also provides for a tile, for example a bullnose tile, comprising a sealant and a cured digital décor.

The invention can also relate to an equipment for performing the method according to any of the first, third and/or fourth independent aspects. For example, an equipment comprising a digital inkjet printer that is configured to print directly the curable ink onto the ceramic material, for example that is free from any basecoat applicator. This equipment can comprise one or more of the features described in relation to the other independent aspect of the invention.

Figure 2:
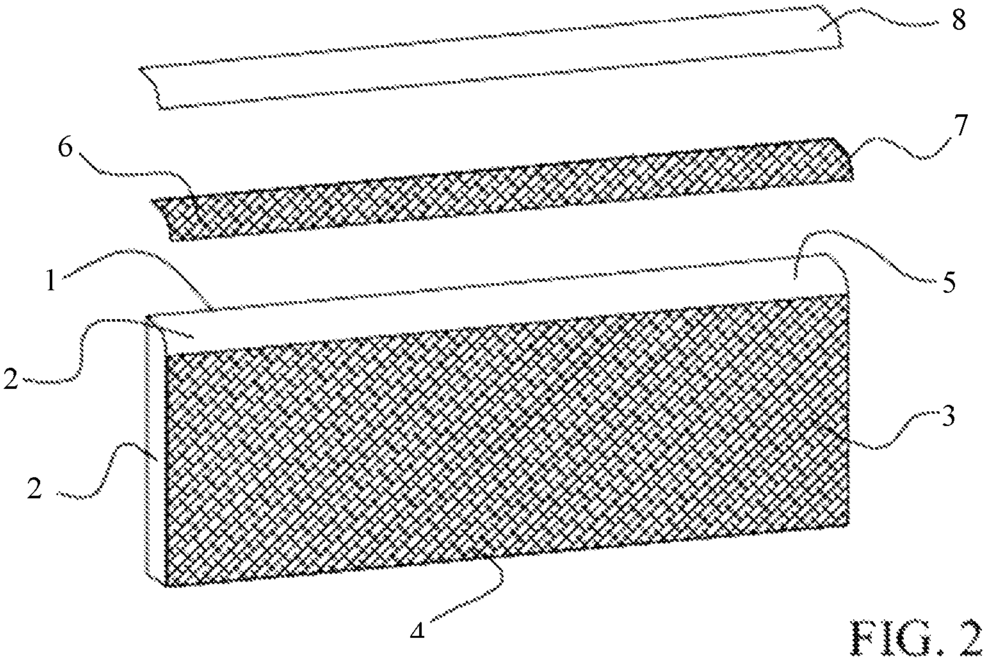
FIG. 2 is the same view of FIG. 1 with an exploded view of the layers on top of the bullnose edge.
Figure 3:
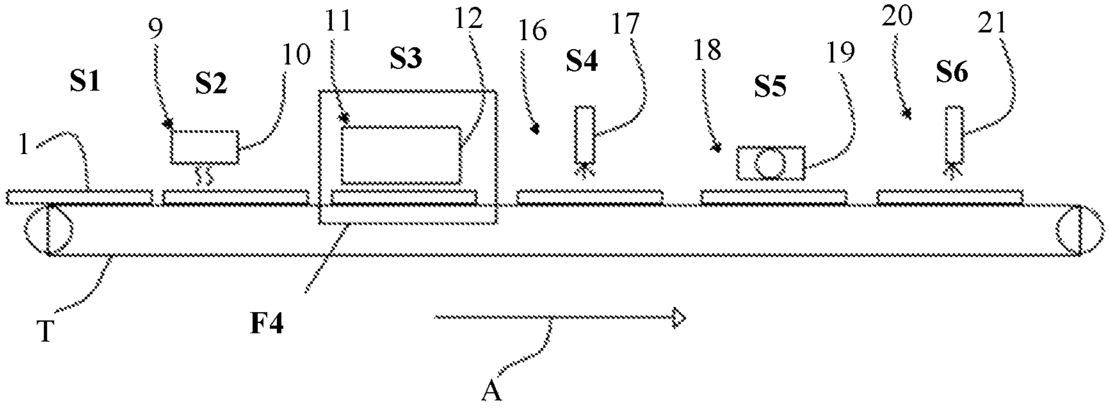
FIG. 3 is a schematic view of the method according to the first aspect of the invention.
Figure 4:
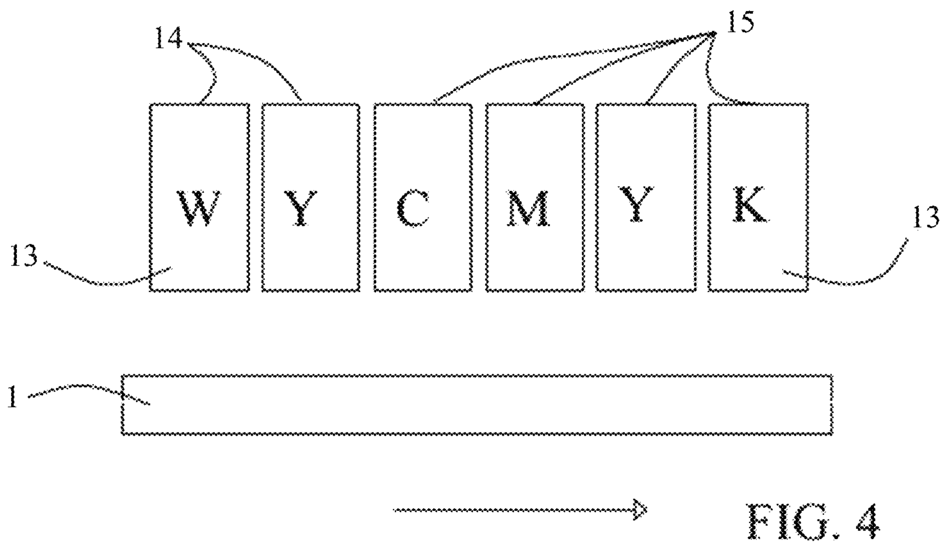
FIG. 4 is an enlarged schematic view of the area indicated with F4 in FIG. 3.
Figure 5:
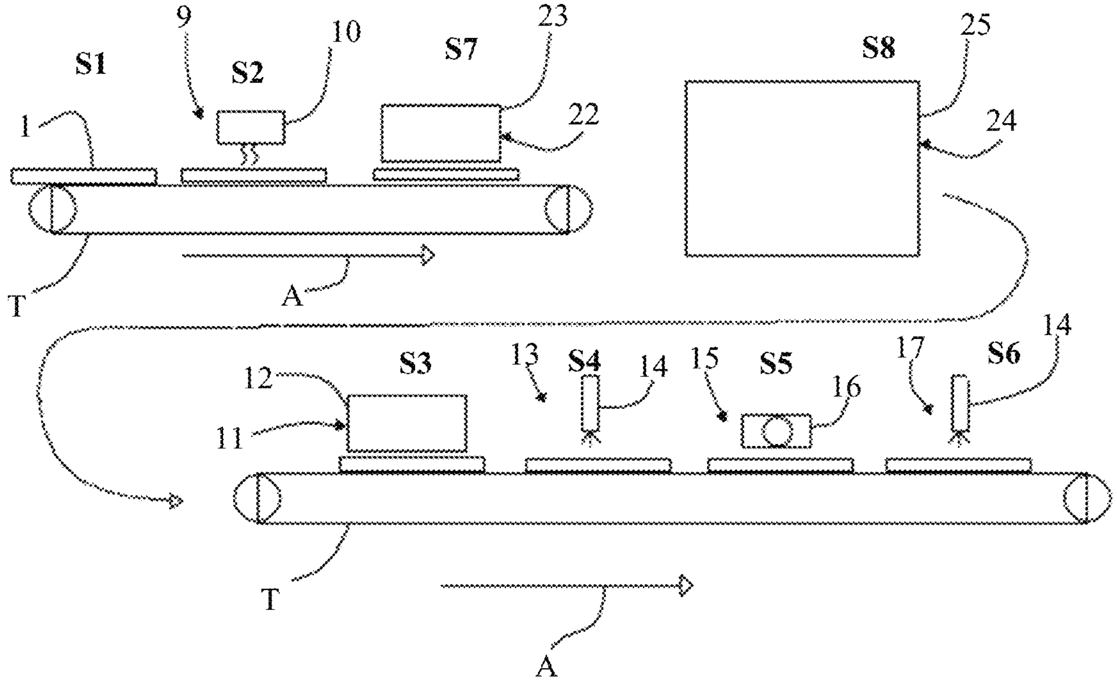
FIG. 5 is a schematic view of the method according to the second aspect of the invention.

With the intention of better showing the characteristics of the invention, in the following, as an example without any limitative character, several preferred forms of embodiments are described with reference to the accompanying drawings, wherein:

FIG. 1 shows a perspective view of the bullnose tile according to the invention; FIG. 2 is the same view of FIG. 1 with an exploded view of the layers on top of the bullnose edge; FIG. 3 is a schematic view of the method according to the first aspect of the invention; FIG. 4 is an enlarged schematic view of the area indicated with F4 in FIG. 3; FIG. 5 is a schematic view of the method according to the second aspect of the invention.

FIG. 1 shows a bullnose tile 1 comprising a base body 2 made of a ceramic material. Said ceramic material is preferably porcelain, for example it shows a water absorption below 0.1 as measured according to EN ISO 10545. The base body 2 comprises a main surface 3 provided with a décor 4 obtained with vitreous material, in particular at least a glaze. The main surface 3 can comprise one or more glaze layers and a print obtained by inkjet printing of ceramic inks.

The bullnose tile 1 further comprises one bullnose edge 5 having a rounded shape. Said bullnose edge 5 comprises a décor that, preferably matches the décor 4 on the main surface 3 of the tile 1.

As shown in FIG. 2, the bullnose tile 1 comprises a decorative layer 7 provided with said décor 6 that is made of cured inks. It is to be noted that the decorative layer 7, and in particular the inks thereof, are in direct contact with the ceramic material of the base body 2. The decorative layer 7, and in particular the décor thereof, is obtained by digital inkjet printing, preferably with a resolution of 320 dpi. The decorative layer 7 has a thickness comprised between 6 and 25 μm.

On top of the decorative layer 7 is provided a protective coat 8. The protective coat 8 is transparent or translucent. Preferably the protective coat 8 has a thickness that is higher than that of the decorative layer 7. The protective coat 8 can also comprise filler, like mineral particles (not shown). In particular, flattening agents like talc or calcium carbonate to create a matte effect.

FIG. 3 shows some steps of the method for manufacturing the bullnose tile 1 of FIGS. 1 and 2 according to the first independent aspect of the invention. The bullnose tile 1 is provided on top of a transporter T in a first step S1 of providing said bullnose tile 1. The transporter 1, for example transporting belt, moves the bullnose tile 1 in an advancing direction A. It is to be noted that the bullnose tile 1 provided at the first step S1 comprises the glazed décor 4 on the main surface 3 and has a bullnose edge 5 that is free from any glaze or coating so that the ceramic material forming the base body 2 is exposed at said bullnose edge 5. Said bullnose tile 1 can be obtained by cutting a ceramic tile into pieces and then grinding said pieces to create the bullnose edge 5. Said cutting and grinding step, although not shown, can form part of the method of the invention. Since said cutting and/or grinding steps can be performed with the aid of lubricant in a wet process they can be followed by a drying step.

The bullnose tile 1 is transported to a drying station 9 preferably provided with an IR lamp 10, for drying at least the bullnose edge 5 of the bullnose tile 1 in a drying step S2. In said draying step S2 it is ensured that the bullnose edge 5 is completely dry at the time of performing the subsequent steps. The porosity of the ceramic material forming the base body 2 can absorb moisture present in the atmosphere thereby negatively affecting the adhesion between the ink and the ceramic material. This drying step S2 is further drying step than those performed after grinding or cutting step.

The dried bullnose tile 1 is then transported to a printing station 11 provided with an inkjet printer 12 for the step S3*c* of providing the decorative layer 7, having the décor 6, onto said bullnose edge 5, by inkjet printing a radiation curable ink directly onto the ceramic material of the base body 2. FIG. 3 shows that there is no material application step on the bullnose before the printing step S3.

The set of curable inks may preferably comprise acrylic based inks, for example comprising blend of different types of acrylate oligomers and/or monomers such as polyester acrylate, polyether acrylate, urethane acrylate, epoxy acrylate.

FIG. 4 schematically shows a detail of the printer 12. The printer 12 is a single pass printer that comprises a plurality of printing units 13, each printing unit comprises one or more printing head, and is configured to print only one color. More in detail in a single pass printer 12 the printing units are stationary and the bullnose tile 1 moves of a continuous movement below said printing units 13 that ejects the drops of ink while the bullnose tile 1 moves.

In the example shown in FIG. 4 the printing units 13 comprise printing head having nozzle of 60 μm diameter and configured for ejecting droplets of 12 pl or more and, preferably, to print a quantity of ink between 0.75 to 1.15 mg/sqcm. This helps in forming a layer that is sufficiently thick to show good adhesion performances and mechanical, physical and chemical properties. Moreover, the décor may be printed with a resolution of 360 dpi.

A preferred example shown in FIG. 4, relates to a preferred embodiment of the invention wherein the printer is configured to print a CMYK set of ink, and therefore comprises a CMYK set of printing units 14, and it is configured to print a set of extra ink, preferably white and yellow extra ink, and comprise an extra set of printing units 15. In particular, the extra set of printing units 15 is disposed upstream the CMYK set of printing units 14 with respect to the advancing direction, so that the extra inks are printed first. In this way, the extra ink printed on the bullnose edge 5 can form a background for the CMYK inks, thereby help in developing the colors of the décor 6. The white and yellow ink are mixed together to provide the desired shad of the background. This is particularly preferred in case the color of the décor 6 is lighter than the color of the ceramic material forming the base body 2, for example a white marble décor on a beige or grey porcelain or on a red body tile. It is to be noted that in this preferred example the printer comprises two yellow printing units 13, one is part of the CMYK set of printing unit 14 and the other is part of the extra set of printing unit 15.

In an alternative preferred embodiment, the printer 12 can be configured to print only the CMYK inks and not the extra ink. This depends on the décor 6 to be printed and it is preferably the case when the décor 6 has darker color that the color of the ceramic material of the base body, for example a dark wood décor on a white or grey porcelain. In this case the printer 12 can be free from the extra set of printing unit 14. Generally, it is preferable that the printer comprises said extra set of printing unit 14 that remains inactive during printing according to this alternative preferred embodiment.

Turning back to FIG. 3 the printed bullnose tile is carried to a first curing station 16 provided with an UV lamp 17, preferably a LED-UVA lamp, for curing the decorative layer in a first curing step S4.

After curing the decorative layer 7, the bullnose tile 1 is carried to a coating station 18 comprising a roller coater 19 that performs a step S5 of providing the curable protective coat 8 on top of the decorative layer 7. The protective coat 8 is preferably transparent or translucent and is preferably acrylic based. The protective coat 8 can be provided in form of a suspension comprising the uncured protective coat composition and filler or additives, like mineral particles.

The bullnose tile 1, is subsequently transported to a second curing station 20 provided with an UV lamp 21, preferably a Mercury UVB lamp, for curing the protective coat 8 in a second curing step S6.

FIG. 5 shows an alternative method for manufacturing the bullnose tile 1, according to the fourth aspect of the invention. The method shown in FIG. 5 is particularly effective in case the ceramic material forming the base body 2 comprises a relatively high open porosity, in particular with ceramic material of class Bib and B2 according to EN 14411, but also for ceramic materials showing a porosity above 0.1%, for example above 0.3% according to EN ISO 10545.

The method of FIG. 5 has the same steps of the method of FIG. 3, but it further comprises a step S7 of providing a sealant to at least partially filling the open porosity of the ceramic material at least in correspondence of said bullnose edge. In the example, the bullnose tile 1, after drying step S2 is carried to a sealing station 22 comprising an application device 23, preferably a drier or a roller applicator for performing the sealing step S7. Preferably the sealant can comprise polymer, oligomer, monomer or blends thereof that are epoxy based, siloxane based unsaturated polyester based or polyvinyl base or a mixture thereof.

The sealant preferably is a curable substance, more preferably a heat curable substance, in particular organic substance. Thus, the method further comprises the step S8 of curing, drying the sealant. This sealant curing step S8 is preferably performed in a third curing station 24 provided with a drying chamber 25.

As shown in FIG. 5, sealing steps S7 and S8 are performed upstream to said printing step S3. The drying step S2 is preferably performed upstream than the sealing steps S7 and S8, but it is possible that the drying step S2 is performed downstream or both upstream and downstream to said sealing steps S7 and S8.

The present invention is in no way limited to the hereinabove described embodiments, as such bullnose tile, method and equipment may be realized according to different variants without leaving the scope of the present invention.

Further, as is clear from the content of the description, the present invention relates to one or more of the items as listed below, numbered from 1 to 49:

1. A method for manufacturing a bullnose tile comprising the steps of:
   - providing a ceramic tile that comprises a base body made of a ceramic material, wherein the base body has a main surface and a bullnose edge;
   - providing a decorative layer on top of said bullnose edge, by inkjet printing a curable ink to form a décor; and curing said curable ink;

wherein said curable ink, after printing, is in direct contact with the ceramic material of the base body.
2. The method according to item 1, wherein said curable ink is a white ink or a yellow ink.
3. The method according to any of the preceding items, wherein said step of providing a decorative comprises printing a set of curable inks, preferably a cyan, magenta, yellow and black (CMYK) set of colors.
4. The method according to any of the preceding items, wherein said step of providing a decorative layer comprises the printing with a CMYK set of inks and a set of extra ink.
5. The method according to any of the preceding items, wherein said step of providing a decorative layer comprises the step of printing a background color and/or the step of printing a décor.

6. The method according to item 5, wherein said step of curing the background color and said step of curing the décor are performed in the same step.

7. The method according to item 5, wherein said step of printing the background color and said step of printing the décor are performed with the same printer.

8. The method according to any of the preceding items, wherein said décor provided on the bullnose edge matches a décor provided on the main surface of the tile.

9. The method according to any of the preceding items, wherein said printing step is a single pass printing operation.

10. The method according to any of the preceding items, comprising the step of providing a protective coat on top of said décor.

11. The method according to item 10, wherein said protective coat is a curable protective coat.

12. The method according to item 11, comprising the step of curing said protective coating.

13. The method according to any of the preceding items, wherein said step of curing comprises UV or UV LED curing.

14. The method according to item 13, wherein said step of curing involves using a gallium, mercury lamp or a LED-UV lamp.

15. The method according any of the preceding items, wherein said curable ink is an acrylate-based ink.

16. The method according to any of the preceding items, wherein during the printing step the tile advances along an advancing direction, and wherein the printer comprises a plurality of printing unit aligned along said advancing direction, wherein each printing unit is configured to print one color, and wherein the first printing unit the tile meets along said advancing direction is configured to print a white ink.

17. The method according to any of the preceding items, wherein during the printing step the tile advances along an advancing direction, and wherein the printer comprises a plurality of printing unit aligned along said advancing direction, the tile comprises a first set of printing unit for printing a CMYK set of ink and, and a second set of printing unit for printing at least an extra ink, and wherein said second set of printing unit is disposed upstream to said first set of printing unit.

18. The method according to any of the preceding items, wherein during the printing step is printed a CMYK set of inks and at least one extra ink.

19. The method according to item 10, wherein said step of providing the protective coat is a roller coating step.

20. The method according to any of the preceding items, wherein the main surface of the base body is covered with a glaze, and wherein said bullnose edge is substantially free from said glaze.

21. The method according to any of the preceding items, comprising the step of drying at least the bullnose edge before said step of printing.

22. The method according to item 21, wherein during this drying step is removed air moisture from the ceramic material of the base body.

23. The method according to any of items 21 and 22, comprising the step of cutting a tile into pieces and grinding said pieces for forming said bullnose edge, and wherein said cutting and or grinding is a wet process, and wherein said method comprises a further drying step for removing the water or lubricant, before the drying step of the bullnose edge.

24. The method according to any of the preceding items, wherein the ceramic material is porcelain.

25. The method according to any of the preceding items, wherein said step of printing said curable ink is performed via a printhead having nozzle of 60 μm diameter.

26. The method according to any of the preceding items, wherein the décor comprises a thickness between 6 to 25 μm.

27. The method according to any of the preceding items, wherein the décor is printed with a resolution of 360 dpi.

28. The method according to any of the preceding items, wherein the décor is provided in a quantity of 0.75 to 1.15 mg/sqcm.

29. The method according to item 10, wherein said step of providing the protective coat is an inkjet printing step.

30. The method according to item 10, wherein said protective coating is transparent or translucent.

31. The method according to item 10, wherein said protective coating comprises a flattening agent.

32. The method according to item 10, wherein said protective coating comprises mineral particles.

33. The method according to item 10, wherein said protective coating comprises a thickness higher than the thickness of the decorative layer.

34. The method according to any of the preceding items, wherein the step of printing said curable ink comprises jetting droplets of 12 pl.

35. A bullnose tile obtained by the method according to any of the preceding items.

36. A bullnose tile comprising a ceramic body and a bullnose edge, wherein said bullnose edge comprises a cured digitally printed décor in direct contact with the ceramic body.

37. The bullnose tile of item 36 and comprising one or more of the features obtained via the method of any of the items from 2 to 34, irrespective from the features of item 1.

38. A method for decorating a ceramic tile comprising the steps of:

providing a tile having a base body made of a ceramic material, said base body having a main surface;

providing a decorative layer on top of said main surface, by inkjet printing a curable ink for forming a décor; and curing said décor;

wherein said curable ink is printed directly on the ceramic material of the base body.

39. The method of item 38 comprising one or more feature according to any of the items from 2 to 34, irrespective from the features of item 1.

40. A ceramic tile obtained via the method of items 38 or 39.

41. A method for manufacturing a bullnose tile comprising the steps of:

providing a ceramic tile that comprises a base body made of a ceramic material, wherein the base body has a main surface and a bullnose edge, and wherein said ceramic material has a water absorption above 0.1, more preferably above 0.3 measured according to ISO-EN14411;

providing a sealant to at least partially fill the open pores of said ceramic material, at least at said bullnose edge;

providing a décor on top of said bullnose edge, by inkjet printing a radiation curable ink; and curing said radiation curable ink.

42. The method according to item 41, wherein the sealant is a curable substance, for example heat curable, and wherein the method comprises the step of curing the sealant.

43. The method of item 41 or 42, wherein said sealant is made of an epoxy-based resin.

44. The method according to any of items 41 to 43 and comprising any of the features included in any of the items from 1 to 34, irrespective of item 1.

45. An equipment for manufacturing a bullnose tile comprising a loading station for receiving the bullnose tile, an inkjet printer and a curing station, wherein the equipment is free from any material application device between the loading station and the printer.

46. An equipment for manufacturing a bullnose tile comprising a loading station for receiving the bullnose tile, an inkjet printer and a curing station, wherein the printer comprises a plurality of printing unit aligned along an advancing direction of the bullnose tile, wherein said direction runs from the loading station to the curing station and wherein the printer comprises a first set of printing units for printing a CMYK set of ink and, and a second set of printing unit for printing at least an extra ink, and wherein said second set of printing unit is disposed upstream to said first set of printing unit relative to said advancing direction.

47. The equipment according to any of items 45 or 47, comprising a drying station between the printer and the loading station.

48. The equipment according to any items from 45 to 47, comprising protective coat coating station.

49. The equipment according to item 48, comprising a protective coat curing station.

While several possible embodiments are disclosed above, embodiments of the present invention are not so limited. These exemplary embodiments are not intended to be exhaustive or to unnecessarily limit the scope of the invention, but instead were chosen and described in order to explain the principles of the present invention so that others skilled in the art may practice the invention. Indeed, various modifications of the invention in addition to those described herein will become apparent to those skilled in the art from the foregoing description. Such modifications are intended to fall within the scope of the appended claims.

What is claimed is:

1. A method for manufacturing a bullnose tile comprising the steps of:

providing a ceramic tile, the ceramic tile comprising a base body made of a ceramic material, wherein the base body has a main surface and a bullnose edge;

printing a decorative layer comprising a décor and a background color in a single pass printing operation on top of the bullnose edge, comprising:

printing at least one radiation curable ink and two extra radiation curable inks with a printer comprising a plurality of printing units to form the décor and the background color, wherein the at least one radiation curable ink is a radiation curable (CMYK) set of inks comprising cyan, magenta, yellow, and black, and wherein the two extra radiation curable inks are white and yellow radiation curable inks, and advancing the ceramic tile along an advancing direction, the plurality of printing units aligned along the advancing direction; and curing the at least one radiation curable ink and the two extra radiation curable inks, wherein the at least one radiation curable ink and/or the two extra radiation curable inks, after printing, are in direct contact with the ceramic material of the base body, wherein a first set of printing units is configured for printing the at least one radiation curable ink and a second set of printing units is configured for printing the two extra radiation curable inks, the second set of printing units being disposed upstream of the first set of printing units, and wherein the two extra radiation curable inks are used to form the background color and the CMYK set of radiation curable inks is used to form the décor printed on top of the background color.

2. The method of claim 1, wherein the décor provided on the bullnose edge matches a décor provided on the main surface of the tile.

3. The method of claim 1 further comprising a step of providing a protective coat on top of the décor.

4. The method of claim 3, wherein the protective coat is a curable protective coat.

5. The method of claim 4, further comprising the step of curing the curable protective coat.

6. The method of claim 3, wherein the step of providing the protective coat is a roller coating step.

7. The method of claim 1, wherein the step of curing the at least one radiation curable ink comprises UV or UV LED curing.

8. The method of claim 1, wherein the step of curing the at least one radiation curable ink involves using a gallium or mercury lamp.

9. The method of claim 1, wherein the at least one radiation curable ink is an acrylate-based ink.

10. The method of claim 1, wherein each of the plurality of printing units is configured to print one color, and wherein the first printing unit the tile meets along the advancing direction is configured to print a white ink.

11. The method of claim 1, wherein the main surface of the base body is covered with a glaze, and wherein the bullnose edge is substantially free from the glaze.

12. The method of claim 1, further comprising a step of drying at least the bullnose edge before the step of printing.

* * * * *